(12) United States Patent  (10) Patent No.: US 7,420,177 B2
Williams et al.  (45) Date of Patent: Sep. 2, 2008

(54) HIGH-RESOLUTION-IMAGING SYSTEM FOR SCANNED-COLUMN PROJECTORS

(75) Inventors: Forrest Williams, Sandy, UT (US); Robert R. Christensen, Salt Lake City, UT (US); Allen H. Tanner, Sandy, UT (US)

(73) Assignee: Evans & Sutherland Computer Corporation, Salt Lake City, UT (US)

( * ) Notice: Subject to any disclaimer, the term of this patent is extended or adjusted under 35 U.S.C. 154(b) by 0 days.

(21) Appl. No.: 11/336,510

(22) Filed: Jan. 20, 2006

(65) Prior Publication Data

US 2007/0170365 A1  Jul. 26, 2007

(51) Int. Cl.
*G03B 21/00* (2006.01)

(52) U.S. Cl. .............. 250/370.08; 353/31; 353/98; 348/756; 348/36; 359/245; 359/634

(58) Field of Classification Search ............. 250/370.08; 348/756, 36; 359/245, 634; 353/31, 98
See application file for complete search history.

(56) References Cited

U.S. PATENT DOCUMENTS

| 4,289,371 | A | 9/1981 | Kramer |
| 4,297,723 | A | 10/1981 | Whitby |
| 5,614,961 | A | 3/1997 | Gibeau et al. |
| 5,694,180 | A | 12/1997 | Deter et al. |
| 5,982,553 | A * | 11/1999 | Bloom et al. ............ 359/627 |
| 6,204,955 | B1 | 3/2001 | Chao et al. |
| 6,292,310 | B1 | 9/2001 | Chao |
| 6,323,984 | B1 * | 11/2001 | Trisnadi ............... 359/245 |
| 6,369,936 | B1 | 4/2002 | Moulin |
| 6,480,634 | B1 * | 11/2002 | Corrigan ............... 385/4 |
| 6,577,429 | B1 * | 6/2003 | Kurtz et al. ............ 359/279 |
| 6,842,298 | B1 | 1/2005 | Shafer et al. |
| 2005/0018309 | A1 | 1/2005 | McGuire, Jr. et al. |
| 2005/0024722 | A1 | 2/2005 | Agostinelli et al. |

* cited by examiner

*Primary Examiner*—David P. Porta
*Assistant Examiner*—Jessica L Eley
(74) *Attorney, Agent, or Firm*—Thorpe North & Western LLP

(57) ABSTRACT

A system and method for generating a high-resolution image using a scanned-column projector is disclosed. The method includes the operation of generating a time-varying line image. A further operation includes collimating the time-varying line image in at least one plane. An additional operation involves scanning the collimated time-varying line image using a scan mirror. A further operation includes projecting the scanned collimated time-varying line image onto a surface. The scanned collimated time-varying line image is projected with at least one imaging element.

16 Claims, 9 Drawing Sheets

HIGH-RESOLUTION-IMAGING SYSTEM FOR SCANNED-COLUMN PROJECTORS

FIELD OF THE INVENTION

The present invention relates generally to high-resolution imaging systems used in video projection.

BACKGROUND

A variety of different technologies have been developed to produce high-resolution video images. For example, a standard spatial light modulator (SLM) has been developed that uses a two-dimensional array of mirrors. Each mirror can be modulated on and off to produce a pixel of light in the final image. In order to produce an image having a resolution sufficient for high-definition television (HDTV), the SLM can have over two-million independently moving mirrors. Producing an SLM chip that has the requisite number of mirrors can be costly. Moreover, developing a full color SLM using three chips, one for each primary color, has been prohibitively expensive for the consumer market. Projectors using three SLM chips typically cost tens of thousands of dollars.

Column modulators were developed, in part, to overcome the limitations of the SLM. Column modulators are able to produce a 1×N column display of pixels at once rather than using independent mirrors for each pixel. The 1×N column of pixels is referred to as a line image. A plurality of line images can be combined to create a video image. For example, an HDTV display can comprise an image that is 1080 pixels high by 1920 pixels wide. Displays that use column modulators, such as the Grating Light Valve (GLV), as disclosed in U.S. Pat. No. 5,311,360, function by scanning a continuously modulated column (of 1080 pixels in the case of HDTV) across a viewing surface in a time that is considerably shorter than the persistence of vision, so that an apparent two-dimensional image (1080 pixels by 1920 pixels) is created from the scanned line image. Because only 1080 pixels need to be controlled, in this example, rather than over two million, as in the SLM example above, the column modulator can be simpler and less expensive to manufacture and control.

The more-efficient design of the column modulator makes it an optimal choice when a very high-resolution video display is needed, such as a large public video display or a large simulator where near-photo-realistic video is desired. Column modulators can be used to produce video displays having substantially higher resolution than HDTV standards. However, increasing the resolution of a video display also decreases the tolerance for producing a display that is in focus. Depth of focus is the distance the display surface can move and still be in focus. The depth of focus is dependent on the pixel size. As the pixels become smaller in a high-resolution display, the depth of focus tolerance becomes tighter. A high-resolution display can have a depth of focus with a tolerance of less than ±10 mm.

There are various schemes discussed in the patent literature for scanning a substantially one-dimensional spot image (i.e., rastering). But there are no descriptions to date concerning the specification and design of optical systems for distortion-free scanning of two-dimensional line images on a surface having a predetermined shape. The differences in requirements between rastering and line scanning are great enough that the approaches covered in the patent literature for rastering a spot image are generally not applicable to the problem of scanning a high-resolution column image to produce two-dimensional images.

SUMMARY

A system and method for generating a high-resolution image using a scanned-column projector is disclosed. The method includes the operation of generating a time-varying line image. A further operation includes collimating the time-varying line image in at least one plane. An additional operation involves scanning the collimated time-varying line image using a scan mirror. A further operation includes projecting the scanned collimated time-varying line image onto a surface. The scanned collimated time-varying line image is projected with at least one imaging element.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

Column modulators can be designed to operate at a relatively high speed, enabling extremely high definition images to be generated. For example, in one embodiment, the present invention can produce an image having a resolution of 4096 by 8192 pixels. The resolution of the screen is dependent upon the response time required by the column modulator to update the image of each pixel. Each of the pixels in the column can be updated for each new row to enable the two-dimensional display. The entire display comprising a plurality of rows is typically updated at a refresh rate greater than 30 Hz to allow the display to appear as one continuous moving image.

At least one embodiment disclosed herein pertains to the optics required for scanning a high-resolution line image. While this embodiment is described specifically for GLV-based projectors, its use is generally applicable to any type of projector that uses a column modulator to generate two-dimensional images, such as the Grating Electro-Mechanical System (GEMS) disclosed in U.S. Pat. No. 6,307,663.

Figure 1:
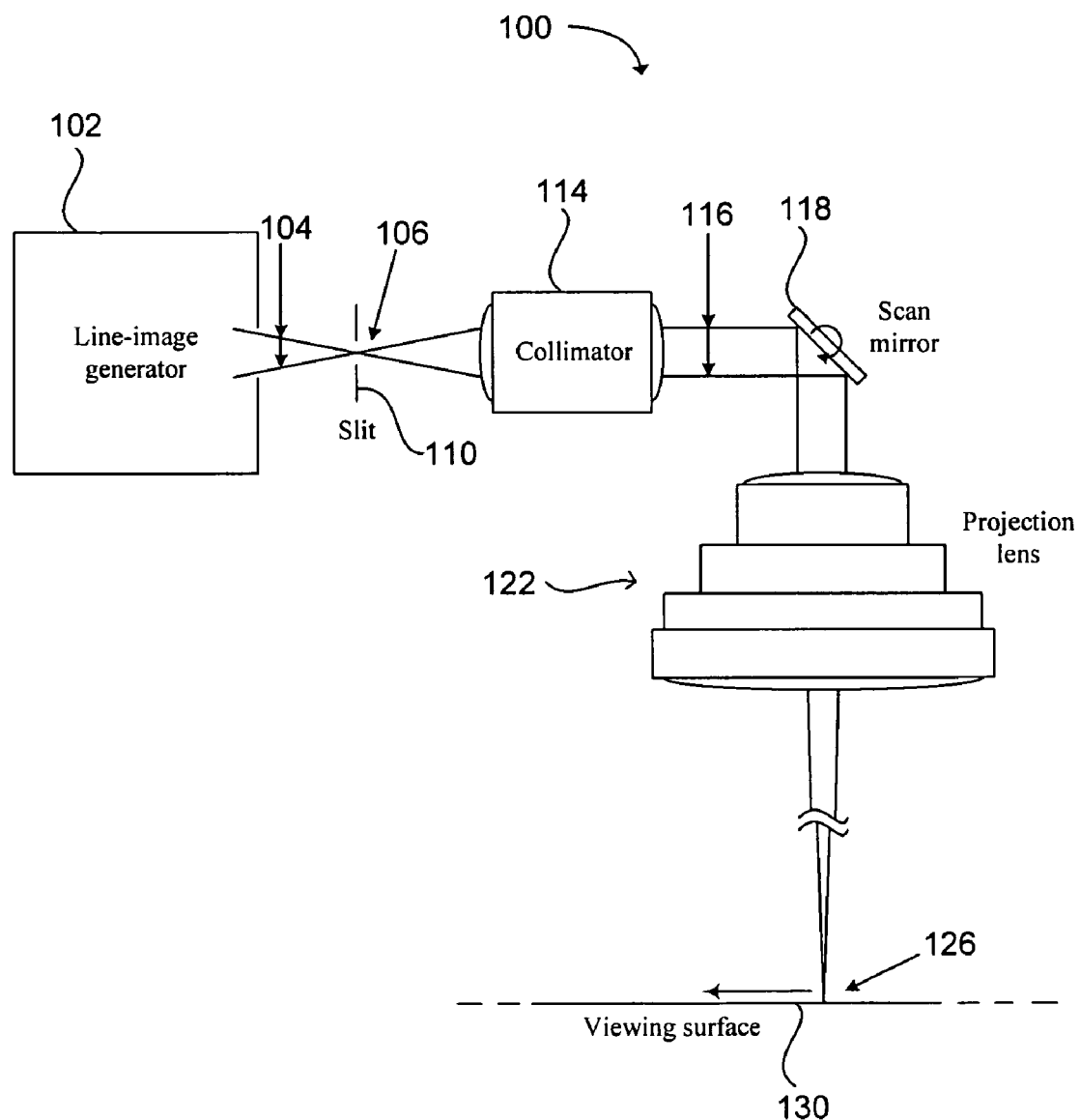
FIG. 1 is a top view of a scanned-column high-resolution imaging system in accordance with an embodiment of the present invention.

One embodiment of a scanned-column high-resolution imaging system 100 for scanning the line image 104 created by a line-image generator 102 is displayed in FIG. 1. The line-image generator of FIG. 1 comprises a system that uses one or more column modulators (e.g., GLVs) to produce a time-varying linear image. The line-image generator forms a so-called intermediate image 106 prior to the scanning portion of the system. This intermediate image is stationary in space. The output of the column modulator may include unwanted stray light. To remove the unwanted stray light from the light bundle, one or more slits 110 can be located in the same plane as the intermediate image. The one or more slits can be linear. In one embodiment, the slit can be larger than the intermediate image to minimize vignetting of the intermediate image. The slit and intermediate image can be positioned in the back focal plane of a multielement optical subsystem called the collimator 114. Since the intermediate image is situated at the collimator's back focus, the collimator reimages the intermediate image at infinity.

If the intermediate image 106 were a uniform, substantially one-dimensional point image, the collimated light bundle 116 emitted by the collimator 114 would exhibit very little or no angular divergence in either the horizontal or vertical planes as it propagated from the collimator. However, the two-dimensional intermediate image formed by a column modulator will generally be anamorphic in spatial and angular distribution, so that the light bundle after the collimator will also behave in a relatively nonuniform manner. For example, as shown in FIG. 1, the collimated light bundle after the collimator will indeed be collimated in the horizontal plane. On the other hand, the light bundle's angular characteristics in the vertical plane can be quite different in spatial and angular distribution.

Figure 2A:
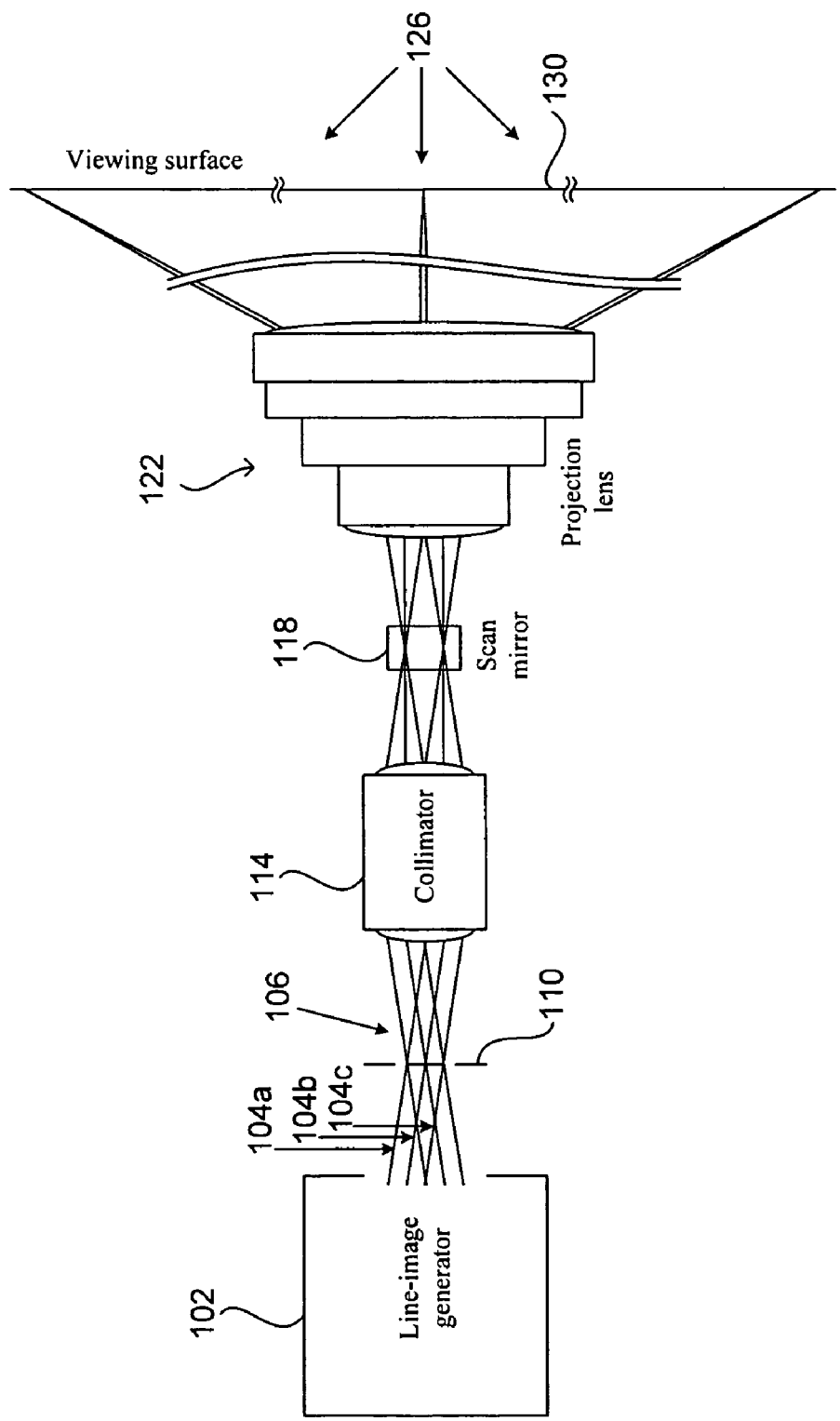
FIG. 2a is a side view of the scanned-column high-resolution imaging system in accordance with an embodiment of the present invention.

FIG. 2a shows a schematic layout of the line-image-scanning optical system as viewed from the side. To simplify visualization, the fold angle in the horizontal plane between the collimator and the projection lens has been opened up to 180°. FIG. 2a shows the marginal rays for three image points: the central point 104b of the field and the points on the upper 104a and lower 104c edges of the field. The marginal rays are those rays that pass near the edge of the system aperture. They can define the edge of the light bundle that propagates through the system. As can be seen by comparing the light bundles portrayed in FIGS. 1 and 2, the collimator is designed such that the marginal rays 104a-c form two focal lines in a plane external to the collimator 114. Note that rays emanating from the image at angles other than the marginal angle also form focal lines in this plane, but at different positions above and below the optic axis. Since each point in this plane contains light from all points in the image, this plane constitutes a pupil. It is thus an ideal place for location of the scan mirror 118, since this external pupil will constitute the substantially minimum extent of the light bundle between the collimator and the projection lens 122 (thereby allowing the use of a small scan mirror). Furthermore, if, as shown in FIG. 2a, the intermediate image 106 is telecentric (i.e., the chief ray for each image point is parallel to the optic axis), this external pupil will comprise the front focal plane of the collimator. Such lenses with external exit pupils are often referred to as "front-stop" lenses. A collimator designed as a front-stop lens typically provides the most efficient approach in terms of scan-mirror size and system optical throughput.

There are several applications for line-image-scanning optical systems. One is for planetarium projectors, in which the viewing surface is a hemispherical dome. Another is for use in home-theater (and similar) displays, in which the viewing surface is a planar rear-projection screen 130. Yet another application is for aircraft-pilot training systems that use toroidal shaped rear-projection screens. In any case, the field curvature of the final image produced by a line-image-scanning optical system must be matched to the curvature of the viewing surface, if substantially in-focus, high-resolution images are to be obtained. In one approach disclosed herein, this curvature matching is performed by the projection lens 122.

Figure 2B:
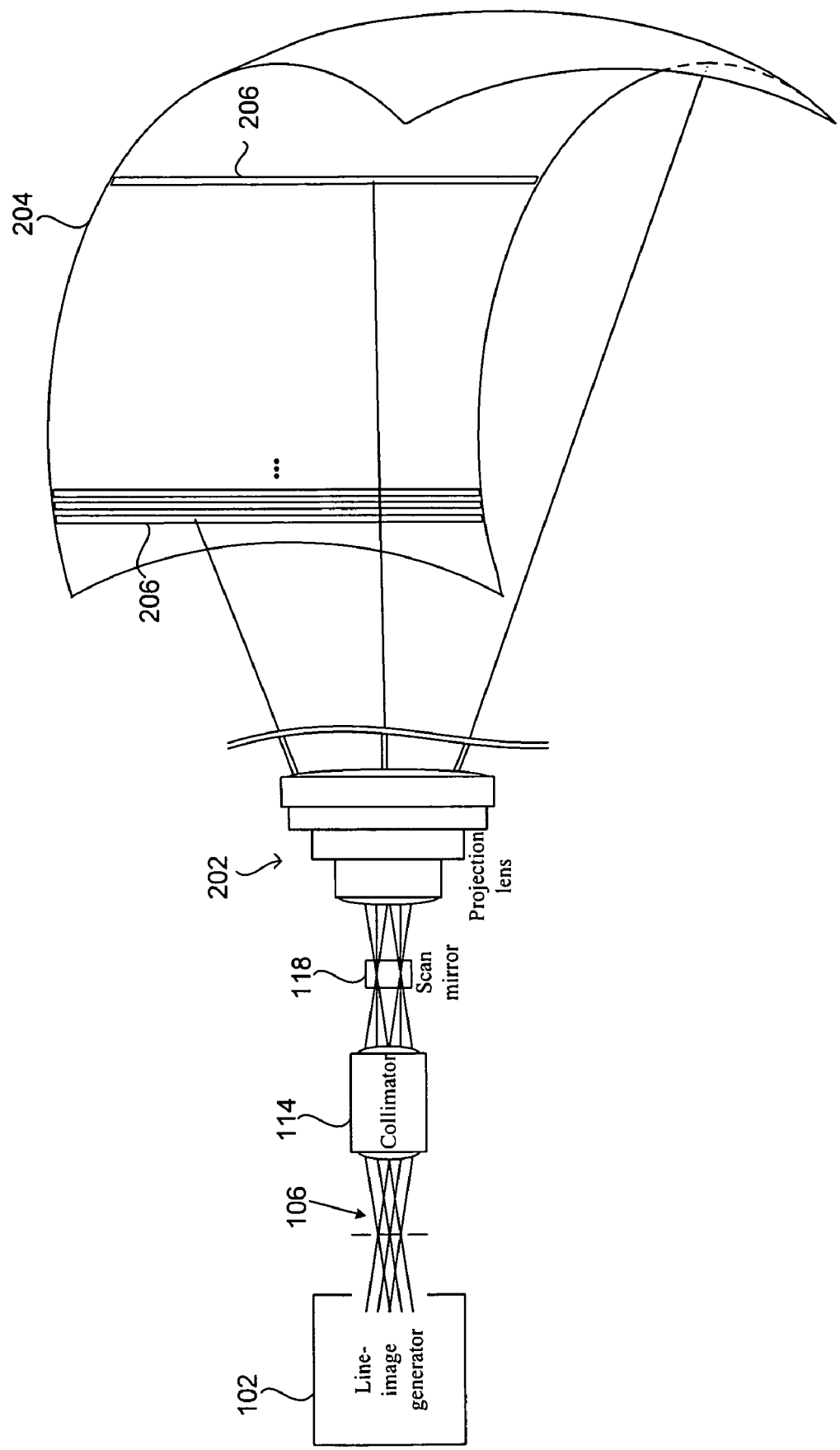
FIG. 2b is the side view of FIG. 2a further displaying a toroidal-shaped viewing surface in accordance with an embodiment of the present invention.
Figure 2C:
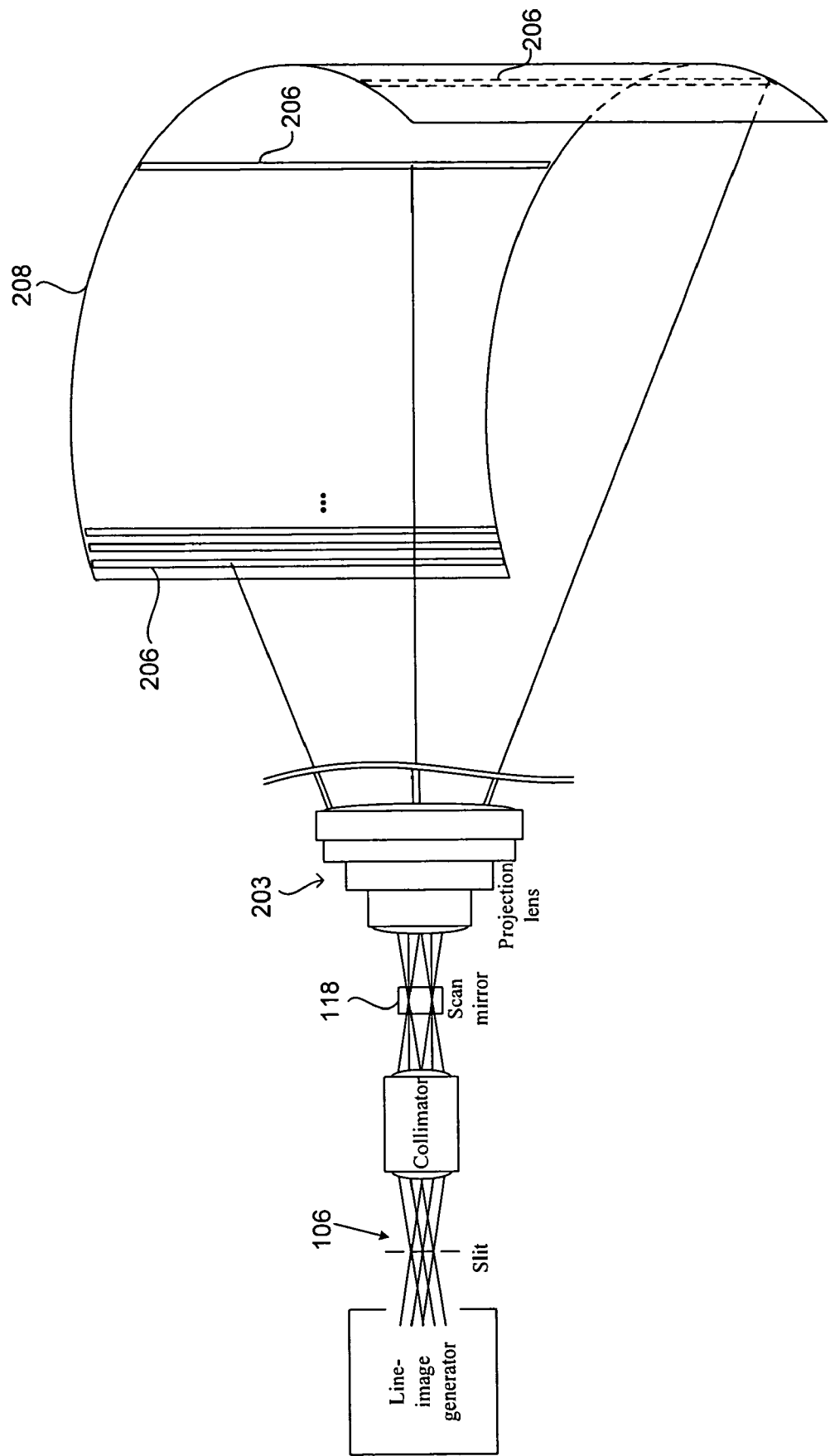
FIG. 2c is the side view of FIG. 2a further displaying a hemispherical-shaped viewing surface in accordance with an embodiment of the present invention.

For example, in one embodiment, as shown in FIG. 2b, the viewing surface can be a toroidal-shaped viewing surface 204. The light-image generator 102 can provide an intermediate image 106 that is collimated in one direction by the collimator 114 and is scanned with the scan mirror 118. The projection lens 202 can be shaped to enable each line image 206 to be projected onto the toroidal viewing surface within an acceptable tolerance to allow the image to be viewed in-focus at each of the different lengths on the viewing surface. Similarly, a projection lens can be formed to match the curvature of a hemispherical viewing surface 208, as shown in FIG. 2c. The projection lens 203 is configured to project each line image 206 onto the hemispherical surface within an acceptable tolerance. The projection lens can also be configured for curvature matching the line image to a cylindrical surface, a flat surface, a spherical surface, or substantially any shape of viewing surface desired.

In addition to matching field curvatures, one or more embodiments of the scanned-column high-resolution imaging system 100 (FIG. 1) can also provide angular magnification of the field angle imparted by the scan mirror 118. This allows scanning the line image over large angular fields of view without the need for large deflections of the scan mirror. Thus, the scan-mirror mechanical design is simplified, since inertial constraints placed on the scan mirror can be relaxed due to the reduced range of required rotation. Field-angle magnification also provides for fields of view that would not be physically realizable if the scan mirror were the last optical element in the system. For example, application of line-image-scanning optical systems, as disclosed in one or more embodiments, to a planetarium display can require fields of view of up to 180° or even greater. Such fields of view may not be achievable using a nonmagnified-scanning approach, since a mirror and/or projector housing can vignette the light bundle as it approaches the margins of the scanned field.

The scan mirror 118 can either rotate in a single direction or both directions. In one embodiment, the scan mirror can rotate in both the clockwise and counterclockwise directions. The projector output can be blanked, or substantially turned off, during one of the two rotations. For example, if an image is refreshed at 60 Hertz, then a new frame is drawn every 16.7 milliseconds. The scan mirror can be run on an 80% duty cycle, enabling the column image to be scanned across the viewing surface in 0.8×16.7 msec=13.4 msec. The output from the projector is then blanked while the scan mirror rotates back to its original position in 0.2×16.7 msec=3.3 msec.

Alternatively, the scan mirror 118 can be rotated continuously in the same angular direction at a constant rate. Both sides of the mirror can be made reflective. If only one side of the mirror is reflective then the best duty cycle possible is 50% for a 180° viewing field. For lesser fields, the duty cycle is even less. However, there are applications in which a continually rotating mirror may be preferred, as when projecting toroidal image fields.

The intermediate image 106 can either be monochromatic or polychromatic. For standard visual systems, the intermediate image will usually be comprised of at least three different line images (not shown), each of a different color (e.g., red, green or blue). These separate line images can then be combined either simultaneously or sequentially in the intermediate-image plane to produce full-color images on a viewing surface, such as the hemispherical viewing surface 208. Since the light bundles from all such intermediate images will pass through the same line-image-scanning optical system, such as the collimator 114 and projection lens 122, the system is typically designed to be substantially free of chromatic aberration.

Methods for correcting chromatic aberration fall under three general categories: reflective, catadioptric and refractive.

The most direct way to assure a system is free of chromatic aberration is to construct it entirely with reflective optics (i.e., mirrors). Since reflection is generally independent of wavelength, rays of different wavelength will image in an identical manner, so that an all-reflective system will yield an image that is without chromatic aberrations. However, high-resolution reflective designs often suffer from the need for long propagation distances between elements, resulting in exorbitantly large system dimensions. In addition, the total number of mirrors used in an all-reflective system must be kept low, since system complexity increases geometrically with each additional mirror. Also, for at least one or more of the embodiments discussed here, the light path through a reflective system is designed to be at an angle and laterally displaced with respect to the mirror axes to avoid vignetting the light bundle. Thus, the mirror surfaces of such off-axis reflective systems require complicated aspheric shapes in order to form an accurate image.

Systems that incorporate both reflective and refractive optics in the same layout are called catadioptric. Catadioptric designs often seek to simplify the mirror-surface specifications by introducing aspheric forms into the refractive surfaces of the system. Because refractive optics involve transmission through a region of greater refractive index compared to air, aspheric forms for refractive optics are often simpler compared to an aspheric reflective optic of similar performance.

Figure 3:
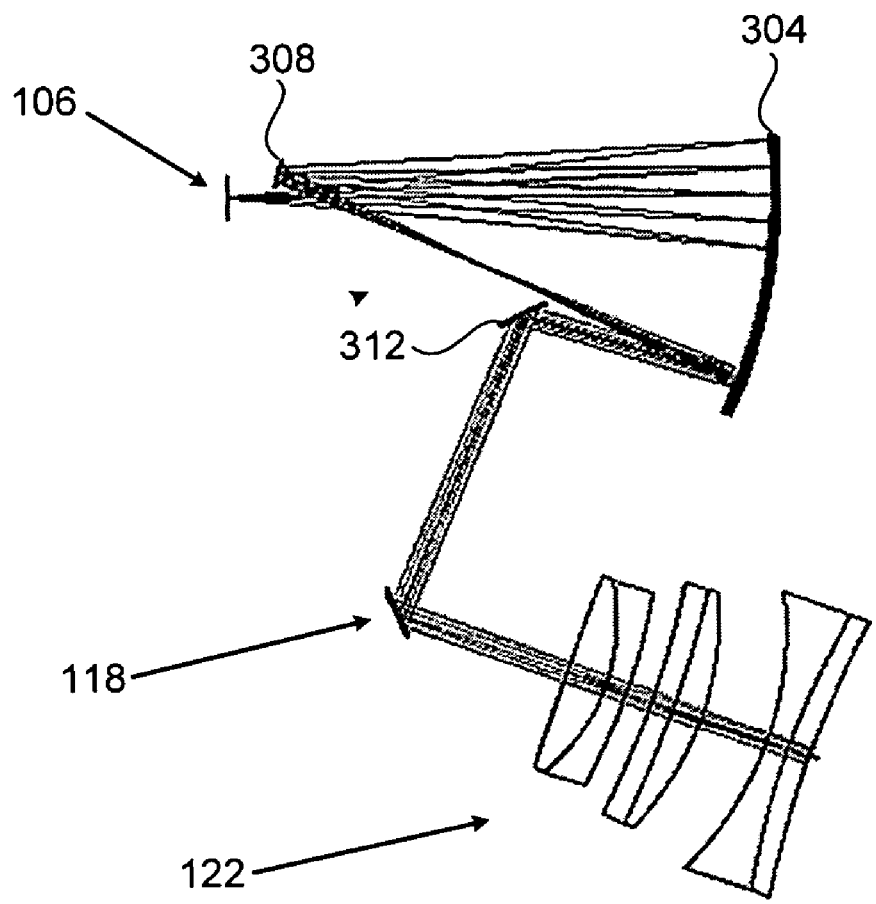
FIG. 3 is a catadioptric structure configured for use in the scanned-column high-resolution imaging system in accordance with an embodiment of the present invention.

For example, a catadioptric structure comprised of reflective and refractive elements is shown in FIG. 3. The intermediate image 106 is directed toward a first reflective element 304. The image is redirected to a reflective collimator comprising reflective elements 304, 308 and 312. The collimated line image is then directed towards scan mirror 118 which scans the line image and redirects it through a refractive projection lens 122.

In the figure, the collimator is portrayed as a set of mirrors arranged in an off-axis configuration. Because of the large numerical aperture of the collimator (NA=0.25), and because it is both tilted and decentered with respect to the light bundle's axis of propagation, the surfaces of the first two mirrors 304 and 308 are highly aspheric in order to achieve better imaging than could be obtained were the mirrors simply spherical. In other words, the surfaces of these mirrors are not plain segments of spheres, but have complicated shapes defined by the general equation:

$$s = \frac{\frac{\rho^2}{R}}{1 + \sqrt{1 - (1+k)\left(\frac{\rho}{R}\right)^2}} + \sum_{i=1}^{N} A_i \rho^{2i}$$

where s is the axial deviation from that of a plane, $\rho$ is the radial distance perpendicular to the optic axis, k is the so-called "conic constant," R is the radius of curvature of the surface at $\rho=0$, and the coefficients $A_i$ provide the amount of "weighting" given to the even terms $\rho^{2i}$ that modify the surface shape (note that, when $k=A_i=0$, s describes a sphere). The total number N of even terms is usually $\leq 8$, although designs with values of N as high as 12 have been reported in the literature.

The specific design illustrated in FIG. 3 utilizes positive conic constants (i.e., k>0) but manages to avoid the use of aspheric terms (i.e., $A_i=0$) in the collimator by making the first surface of the projection lens be an even asphere with $k=-1$ and $N=4$. Of course, there are many other equivalent catadioptric designs that can be used. This is merely one example embodiment.

However, especially for off-axis approaches as described in one or more embodiments in the present application, both all-reflective and catadioptric systems can be excessively large and expensive. Thus, while there can be applications where all-reflective and catadioptric systems may be used, a substantially refractive system is typically desired.

The most economical approach for the line-image-scanning optics is to use an all-refractive design like the one depicted in FIGS. 1 and 2a-2c. Technically speaking, the system portrayed in FIGS. 1 and 2a-2c is catadioptric in nature, since a reflective scan mirror 118 is used to redirect the light bundle between the collimator 114 and the projection lens 122. However, since the scan mirror is planar (at least in the embodiment portrayed in FIGS. 1 and 2a-2c), it has no direct effect on image quality, so that the imaging system of FIGS. 1 and 2a-2c may still be regarded as all-refractive, although there may be applications in which it would be advantageous to incorporate curvature in the scan mirror as well. Such an all-refractive system offers several advantages over all-reflective and catadioptric approaches. Some of the advantages are: (1) the optics of an all-refractive system are on-axis, simplifying alignment, (2) an all-refractive system is compact, allowing for smaller projector dimensions, and (3) all-refractive systems will generally be less expensive to fabricate.

The difficulty in employing all-refractive designs stems from the phenomenon of dispersion, in which the refractive index of a material depends on wavelength. Because of dispersion, a single imaging lens will typically exhibit different focal lengths for different wavelengths. This effect has been known for centuries, and consequently, sophisticated methods for correcting chromatic aberrations in refractive optics have been developed over the years. Achromatic methods usually involve using a succession of lenses of different types of glass and surface curvatures to compensate chromatic effects as the light propagates through the lens assembly 122.

Achromatic designs for high-resolution line-image-scanning optical systems are not outside the scope of the present specification. Some of these designs utilize the intentional introduction by the line-image generator of small differences between the three different primary color intermediate images in axial image location and lateral size. This deviation of colocality and size constitutes the presence of artificial chromatic distortion, called axial and lateral color, respectively, in the intermediate image. By introducing axial and lateral color in the intermediate image that is complementary to the residual chromatic errors in the final image, the chromatic design constraints of the line-image-scanning optical system for each of the primary colors may be somewhat relaxed. However, as is discussed below, there are applications for the disclosed invention in which artificial axial color in the intermediate image is not allowed. In this case, the design of the line-image-scanning optical system, especially that of the collimator, can be considerably more complicated.

In one embodiment, the light sources of the line-image generator can be lasers. Using lasers to illuminate column modulators like GLVs offers advantages in terms of optical efficiency and color saturation compared to what can be achieved using incoherent sources (e.g., lamps). However, due to the high degree of coherence exhibited by lasers, images formed using lasers almost always exhibit a graininess known as laser "speckle" that is regarded as a negative effect. Consequently, when lasers are used as light sources for line-image generators, methods are often employed to reduce or eliminate laser speckle in the image.

Figure 4:
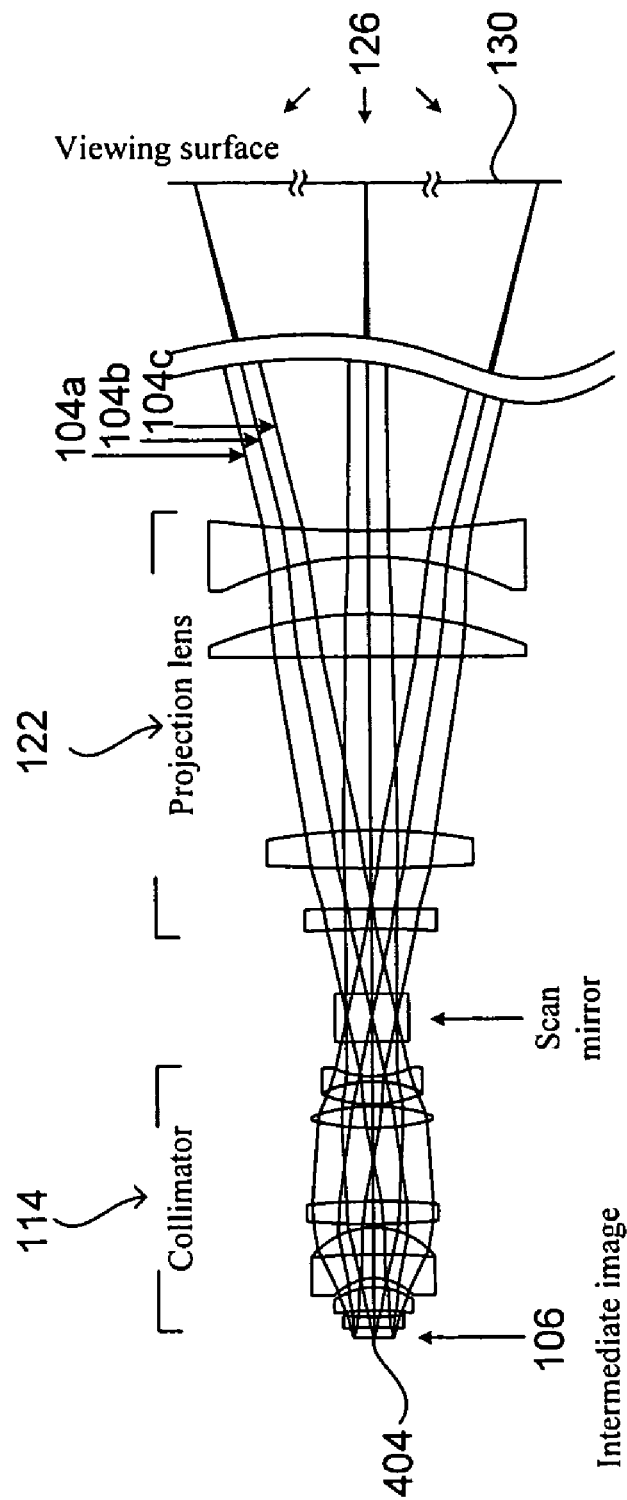
FIG. 4 is an exploded view of an imaging structure configured for use in the scanned-column high-resolution imaging system in accordance with an embodiment of the present invention.

The most practical method for laser-speckle mitigation in line-image-scanning optical systems involves locating a transmissive two-dimensional phase grating in the plane of the intermediate image. For example, the phase grating 404 may be placed at a first end of the collimator 114, as shown in FIG. 4. An in-depth discussion of how such a phase grating reduces laser speckle is beyond the scope of this disclosure. However, it is sufficient to state within the present context that the presence of a phase grating in the plane of the intermediate image is similar in effect to that of placing a rear-projection screen at the intermediate image. The line-image-scanning optical system will then reimage the intermediate images of the different colors as though they are co-located in the plane of the phase grating, regardless of where the separate images are actually located relative to the position of the phase grating. Thus, the intermediate images of all the colors must be focused onto the phase grating in order to yield a focused final image on the viewing surface. This requirement removes the possibility of using artificial axial color in the intermediate image as a partial means for achieving achromatic performance with the line-image-scanning optical system.

In addition to forcing the intermediate image to be free of axial color, the phase grating causes the angular distribution of the light bundle after the intermediate image to increase, so that the input acceptance angle (i.e., the input numerical aperture) of the line-image-scanning optical system is increased to avoid vignetting light after the phase grating. High-resolution chromatically corrected optical systems with large input numerical apertures are historically difficult to achieve. Use of a phase grating therefore represents a substantial challenge to the design and fabrication of high-resolution line-image-scanning optical systems, especially since such systems must also be free of any axial color in either object or image space.

At least one embodiment of the present invention enables the line-image-scanning optical system to produce substantially chromatic-aberration-free high-resolution imaging that is significantly devoid of axial color in either image or object space. FIG. 4 is a schematic layout (viewed from the side) of an example embodiment of an all-refractive version of the scanned-column high-resolution imaging system. To simplify visualization, the fold angle in FIG. 4 between the collimator and the projection lens has been opened up to 180°, as was done in FIGS. 2a-2c.

In one embodiment, the collimator 114, as shown in FIG. 4, is an eight-element assembly, and the projection lens 122 is a four-element assembly. The viewing surface 130, on which the final image 126 is displayed, is planar in this example. While the phase grating constrains the system to have no intermediate-image axial color, lateral color in the intermediate image 404 is still allowed. Consequently, the three different intermediate images, as shown by the top 104a, middle 104b, and bottom lines 104c in each group (corresponding to red, green and blue) are sized differently to assist in correction of residual chromatic aberration in the final image. Specifications for this system are given in Table 1.

Several designs similar to the one specified in Table 1 have been made for different throw distances and final-image sizes, so that the specifications shown in Table 1 are given only as one example of many of the designs covered by the present invention. In addition, while the example shown in FIG. 4 is an all-refractive design, all-reflective and catadioptric designs have also been developed for the current application, and are not to be excluded from the scope of the present invention.

TABLE 1

All-refractive line-image-scanning optical-system specifications

| | | |
|---|---|---|
| Wavelengths of operation | Blue | 448.4 nm |
| | Green | 532.0 nm |
| | Red | 630.9 nm |
| Intermediate image sizes | Blue | 14.630 mm |
| | Green | 15.149 mm |
| | Red | 15.487 mm |
| Collimator effective focal length | | 70 mm |
| Collimator back focal distance | | 9.0 mm |
| Collimator front focal distance | | 46 mm |
| Projection-lens entrance-pupil | | 69 mm |
| Scan-angle magnification | | 2.4 |
| Throw distance | | 2.44 m |
| Final-image size | | 1.18 m (vert) × |
| | | 1.48 m (horiz) |
| Final-image resolution | | 4096 pixels (vert) × |
| | | 5120 pixels |

Several designs similar to the one specified in Table 1 have been made for different throw distances and final-image sizes, so that the specifications shown in Table 1 are given only as one example of many of the designs covered by the present invention. In addition, while the example shown in FIG. 4 is an all-refractive design, all-reflective and catadioptric designs have also been developed for the current application, and are not to be excluded from the scope of the present invention.

Figure 5A:
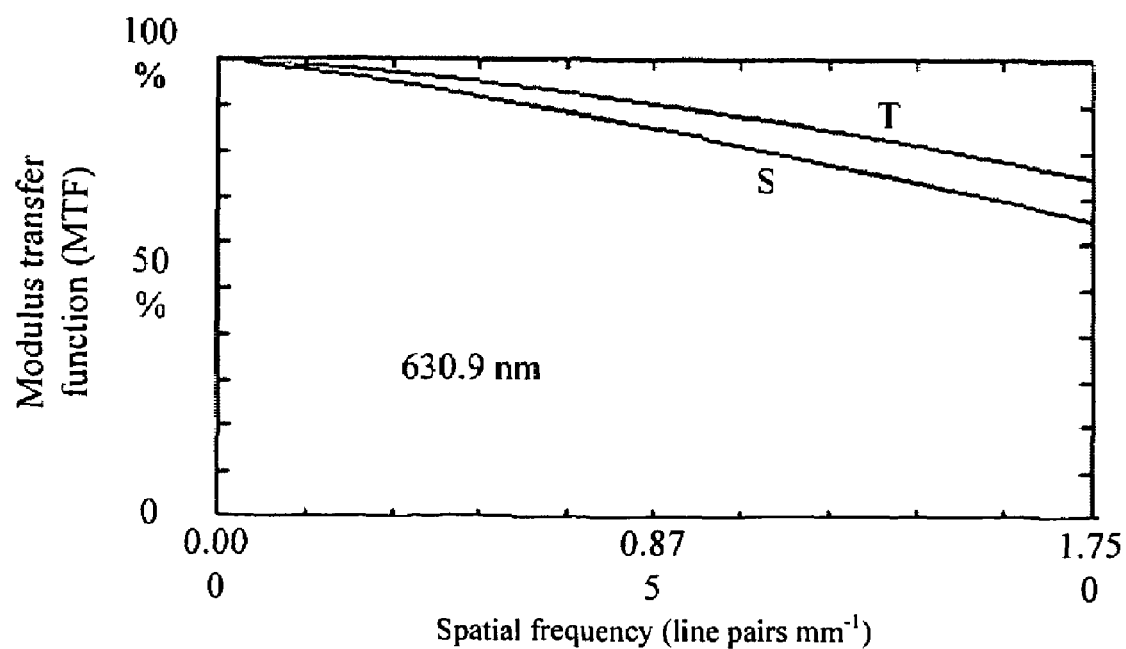
FIG. 5a is a graph displaying the theoretical performance of the scanned-column high-resolution imaging system characterized in terms of a modulus transfer function for blue field points in a portion of the final image in accordance with an embodiment of the present invention.
Figure 5B:
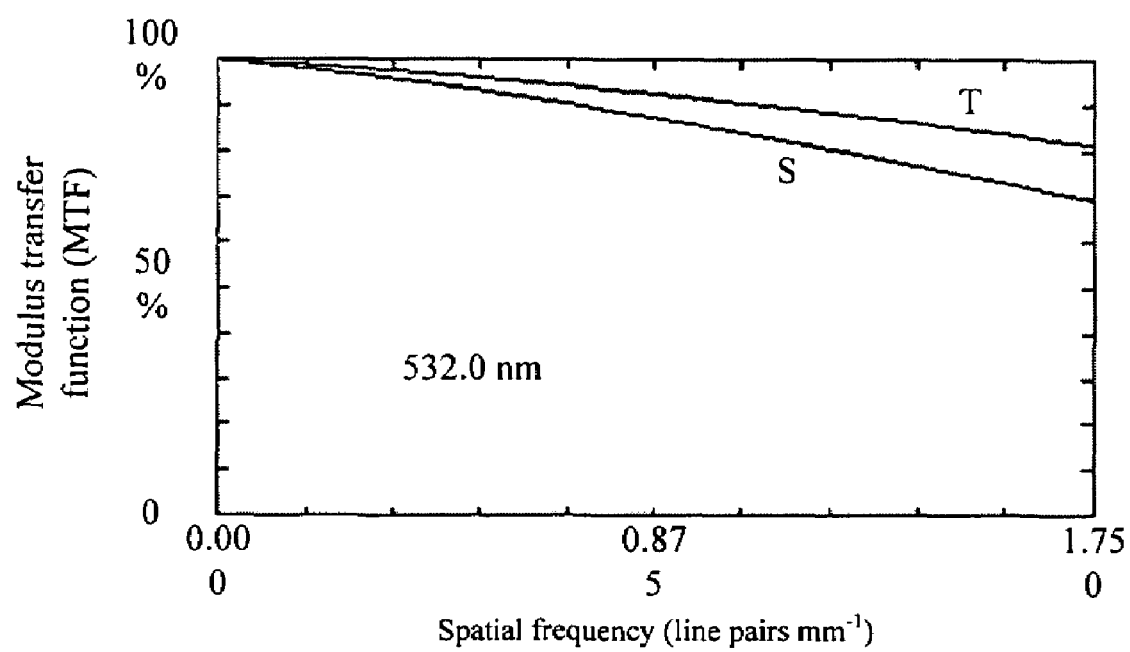
FIG. 5b is a graph displaying the theoretical performance of the scanned-column high-resolution imaging system characterized in terms of a modulus transfer function for green field points in a portion of the final image in accordance with an embodiment of the present invention.
Figure 5C:
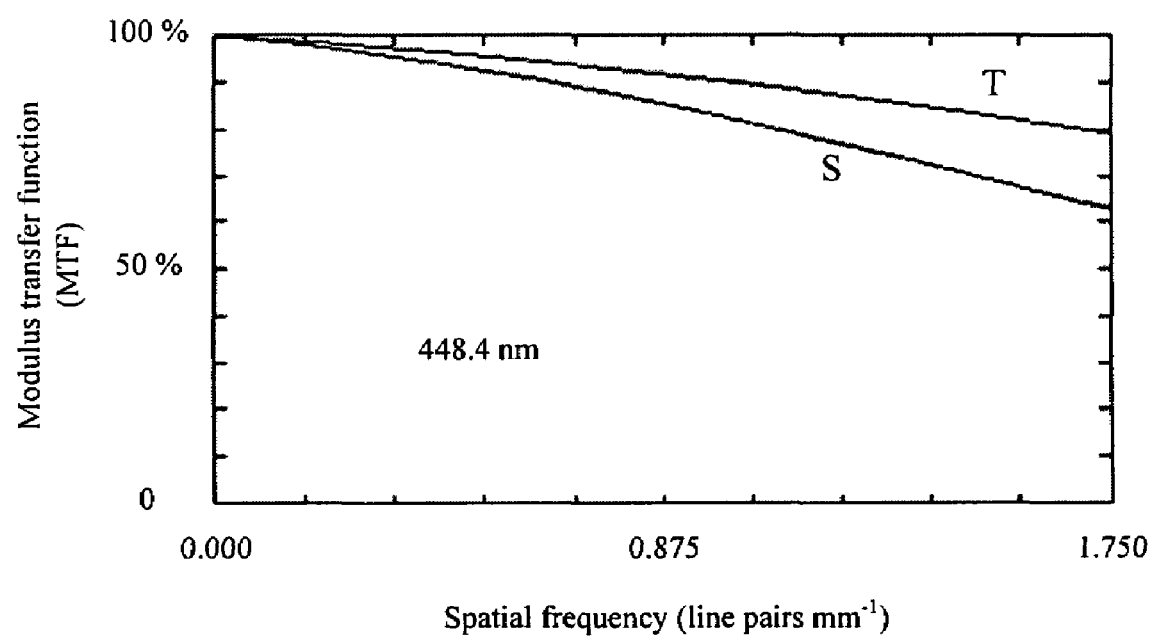
FIG. 5c is a graph displaying the theoretical performance of the scanned-column high-resolution imaging system characterized in terms of a modulus transfer function for red field points in a portion of the final image in accordance with an embodiment of the present invention.

The theoretical performance of the system illustrated in FIG. 4 and Table 1 has been characterized in terms of modulus transfer function (MTF) and lateral color. FIGS. 5a, 5b, and 5c show the MTFs for blue, green, and red field points, respectively, in the lower right-hand corner of the (planar) final image. This particular field point was chosen because it represents the most demanding region of the field, so that system performance for this field point corresponds to the worst case in terms of resolution and lateral color. The image size and pixel count listed in Table 1 correlate to a pixel size in the viewing surface of ~290 μm. Thus, the minimum spatial frequency associated with this pixel size is $(2\times0.29 \text{ mm})^-$ $l=1.74$ line pairs mm$^{-1}$. Inspection of FIGS. 5a, 5b and 5c reveals that the theoretical modulation at this spatial frequency is $\geq 60\%$, which is much better than the standard minimum of 10% for well-resolved images. Both tangential (T) and sagittal (S) MTFs are shown in the figures for the wavelengths shown in Table 1. Lateral color is characterized by the image size as a function of wavelength. Table 2 lists the image sizes at 50% and 100% of the field for the three different wavelengths.

TABLE 2

Image heights of half- and full-field points

| Field | Wavelength | Image size (mm) |
|---|---|---|
| 50% | Blue | 601.2 |
|  | Green | 601.3 |
|  | Red | 601.4 |
| 100% | Blue | 1,244.8 |
|  | Green | 1,244.8 |
|  | Red | 1,244.9 |

Referring to Table 2, it can be seen that lateral color across the field as characterized at half- and full-field zones is no greater than 0.2 mm, or ~⅔ of a pixel. By symmetrical balancing about the center of the field, the lateral color can be cut in half, so that the residual lateral color for any pixel over the full field will be half the total amount, or ~⅓ of a pixel. This amount of lateral color corresponds to less than 0.001% of the total image. Thus, it can be concluded that the all-refractive design disclosed herein yields a very-high-resolution system that is also substantially corrected for chromatic effects.

It should be noted that the image sizes for the edge of the field (i.e., the end of the scan) characterized in Table 2 and FIGS. 5a, 5b and 5c are greater than those at the center of the field. The image height at the edge is 1,245 mm, while at the center the image height is 1,180 mm. This variation in image size is called "pincushion" distortion, and is due to scanning of the line image. While the design discussed here is capable of producing a flat-field image (as evidenced by the image resolution over the field), it can still suffer from the presence of pincushion distortion in the final image. This distortion is due to the rotational symmetry of the projection lens.

In order to correct the image for pincushion distortion, the projection lens would have to include exorbitantly expensive toroidal lenses. Including toroidal lenses in the projection lens can also further complicate its overall design, since toroidal lenses would in turn introduce large amounts of astigmatism that would require greater correction in the projection lens. Fortunately, the maximum distortion occurs at the corners of the field, and amounts to less than 6% of the central image. Thus, this distortion may be removed from the final image by slight overfilling (about 3% on the half-height) of the viewing surface and then "blanking" the image at the edge of the viewed field.

Figure 6:
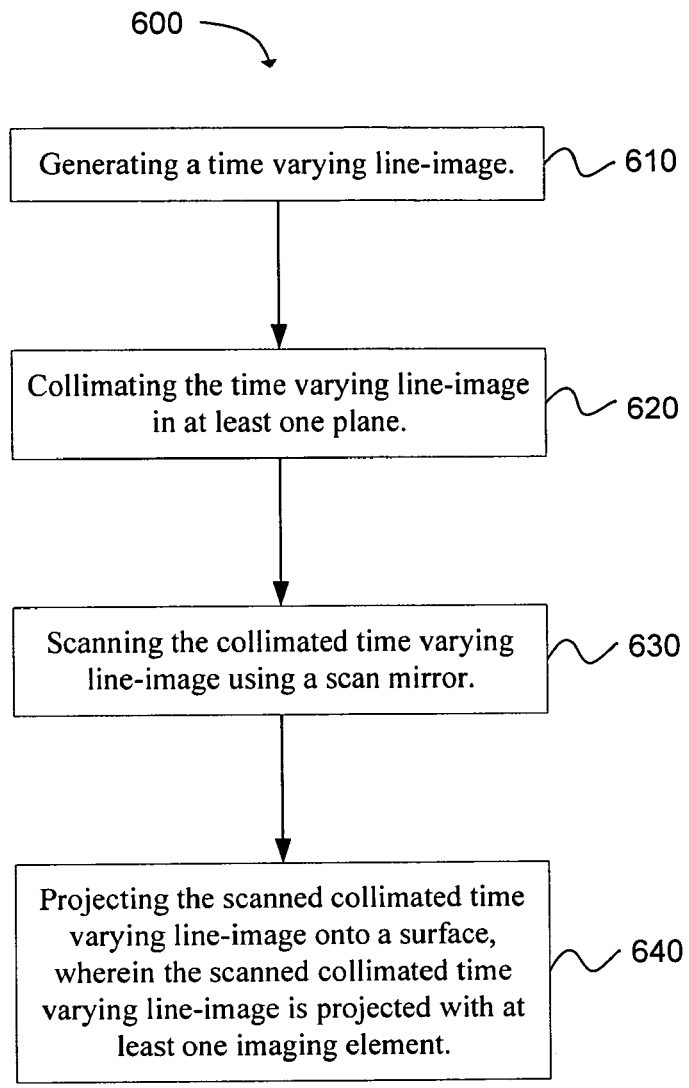
FIG. 6 is a flow chart depicting a method for generating a high-resolution image using a scanned-column projector.

Another embodiment of the invention provides a method 600 for generating a high-resolution image using a scanned-column projector, as depicted in the flowchart of FIG. 6. The method includes the operation 610 of generating a time-varying line image. The time-varying line image can be generated by any type of column modulator such as a GLV, GEMS, or other type of spatial light modulator configured to produce a 1×N pixel column of time varying line-image.

A further operation 620 includes collimating the time-varying line image in at least one plane. For example, the line image may be collimated such that the light bundle will be collimated in the horizontal plane, but continue to display different angular characteristics in the vertical plane. Alternatively, the line image may be a plurality of 1×N pixel rows with a collimated line image collimated in the vertical plane while having different angular characteristics in the horizontal plane. An additional operation 630 involves scanning the collimated time-varying line image using a scan mirror. The time-varying line image can be scanned at a rate greater than the average persistence of vision to produce a two-dimensional image comprised of a plurality of line images.

A further operation 640 involves projecting the scanned collimated time-varying line image onto a surface, wherein the scanned collimated time-varying line image is projected with at least one imaging element. The surface can have a predetermined shape, such as, but not limited to, a cylindrical surface, a flat surface, a spherical surface, a hemispherical surface, and a toroidal surface. The at-least-one imaging element may be reflective, refractive, or catadioptric. The at-least-one imaging element can be formed to enable the projected image to be substantially in focus on the surface having the predetermined shape. The surface may be a rear-projection-type surface, wherein the image is projected behind the surface while being viewed in front of the surface.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A high-resolution imaging system for scanned column projectors, comprising:
a column modulator configured to produce a time-varying line image;
a collimator configured to receive and collimate the time-varying line image in at least one plane, wherein the column modulator is further configured to produce an intermediate image located in a back focal plane of the collimator to enable the collimator to reimage the intermediate image near infinity and wherein the intermediate image is comprised of a plurality of differently colored line images and each of the plurality of differently colored line images are sized differently to assist in correction of residual chromatic aberration in the final image;
a scan mirror operable to receive and scan the collimated line image; and
at least one imaging element configured to shape the scanned collimated line image onto a surface having a predetermined shape associated with the at least one imaging element.

2. The high-resolution imaging system of claim 1, wherein the surface has a predetermined shape selected from the group consisting of a cylindrical surface, a flat surface, a spherical surface, a hemispherical surface, and a toroidal surface.

3. The high-resolution imaging system of claim 2, wherein the surface is a rear-projection surface.

4. The high-resolution imaging system of claim 1, wherein the imaging element is at least one of a reflective element, a refractive element, and a catadioptric element.

5. The high-resolution imaging system of claim 1, wherein the collimator is at least one of a reflective element, a refractive element, and a catadioptric element.

6. The high-resolution imaging system of claim 1, wherein the imaging element comprises a plurality of projection lenses configured to enable the scanned collimated line image to be displayed on the surface having the predetermined shape.

7. The high-resolution imaging system of claim 6, wherein at least one of the plurality of projection lenses is configured to provide angular magnification of a field angle imparted by the scan mirror.

8. The high-resolution imaging system of claim 7, wherein the slit is located in a back focal plane of the collimator.

9. The high-resolution imaging system of claim 1, further comprising a slit located between the column modulator and the collimator, wherein the slit is configured to reduce extraneous light produced by the column modulator.

10. The high-resolution imaging system of claim 1, further comprising a transmissive phase grating located in a plane of the intermediate image.

11. The high-resolution imaging system of claim 1, wherein the plurality of differently colored line images are combined to produce a substantially full-color image on the viewing surface.

12. The high-resolution imaging system of claim 1, wherein each of the plurality of differently colored line images are focused onto the phase grating in order to yield a focused final image on the viewing surface.

13. The high-resolution imaging system of claim 1, wherein axial color is added to one or more of the plurality of different colored line images at the intermediate image that is complementary to residual chromatic error introduced by the imaging element.

14. The high-resolution imaging system of claim 1, wherein lateral color is added to one or more of the plurality of different colored line images at the intermediate image that is complementary to residual chromatic error introduced by the imaging element.

15. The high-resolution imaging system of claim 1, wherein the scan mirror is located between the collimator and projection lens at a front focal plane of the collimator.

16. The high-resolution imaging system of claim 1, wherein the column modulator is selected from the group consisting of a grating light valve and a grating electro-mechanical system.

* * * * *